United States Patent Office 3,482,948
Patented Dec. 9, 1969

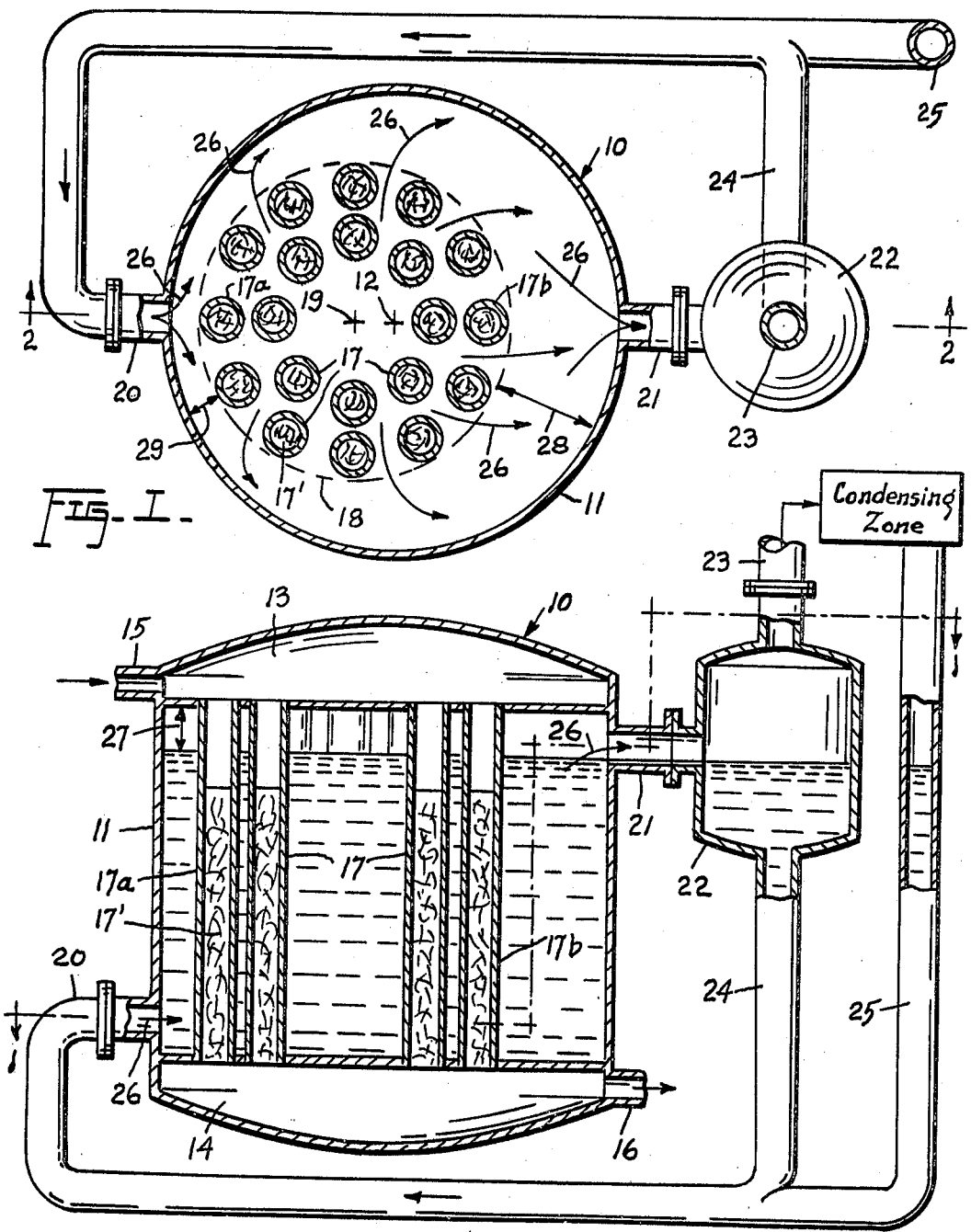

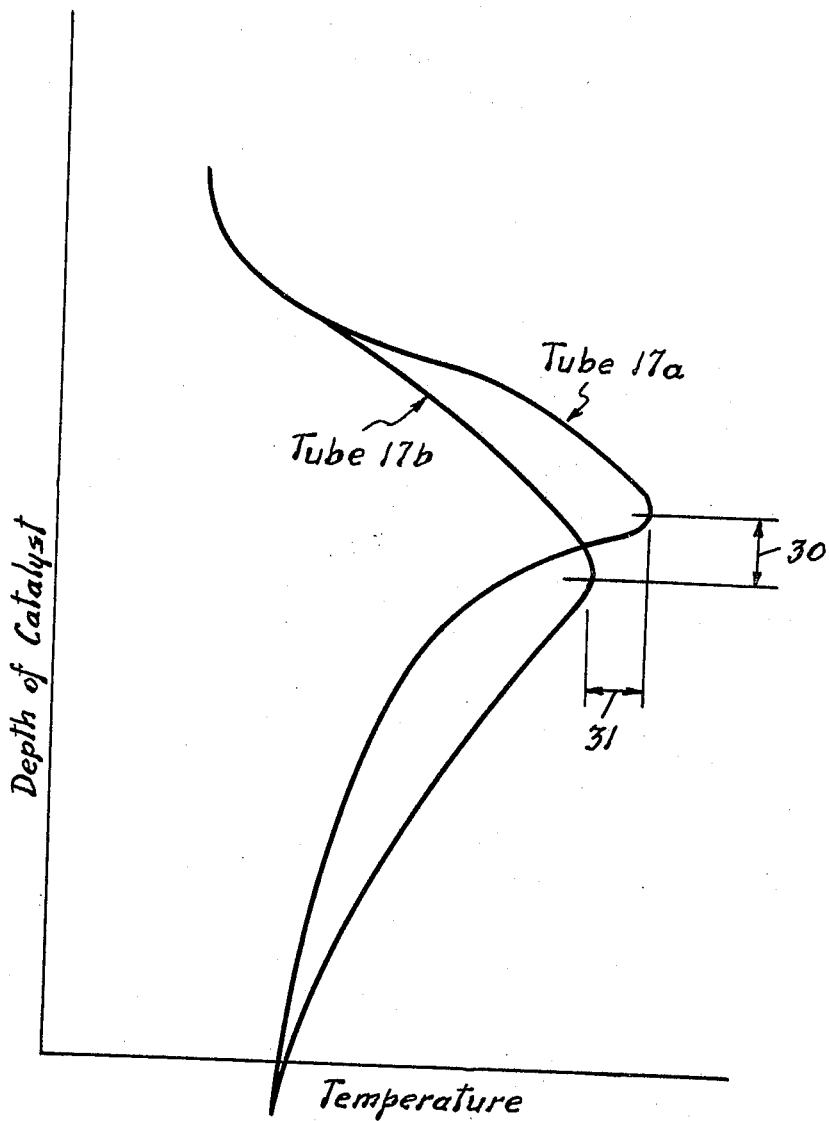
Fig-3-

3,482,948
APPARATUS FOR EXOTHERMIC
CATALYTIC REACTIONS
Herbert E. Miegel, Chappaqua, N.Y., assignor to
Reichhold Chemicals Inc., White Plains, N.Y.
Filed June 14, 1967, Ser. No. 646,071
Int. Cl. B01j 9/00
U.S. Cl. 23—288       3 Claims

ABSTRACT OF THE DISCLOSURE

An exothermic catalytic reactor having an outer shell with an inlet and an outlet for a heat exchange medium, and a group of catalyst containing tubes positioned eccentrically in the shell so that they are closer to the inlet than to the outlet for proportionate control of the distribution and movement of the heat exchange medium in the shell around the tubes.

---

This invention relates to an improved apparatus for carrying out highly exothermic catalytic reactions, particularly those relating to vapor phase oxidation of alcohols to aldehydes, as set forth, for example, in United States Patents Nos. 2,812,308; 2,812,309; 2,812,310; 2,849,492; 2,849,493; 2,852,564 and 2,973,326, and for controlling the temperature of such reactions within more precise limits to approach theoretically optimum conditions with commercial apparatus.

It is well known, in vapor phase catalytic oxidation systems, that if the catalyst temperature can be maintained at a precise level or confined within a narrow range specific to the particular catalyst and material to be oxidized, then the percentage of oxidized products will constitute more of the desired product and less unoxidized or overoxidized constituents.

Since most catalytic vapor phase organic oxidations are highly exothermic, the problem of effective and efficient heat removal from the catalytic zone becomes the prime factor in determining the degree of oxidation to the desired reaction product.

In the laboratory such heat transfer conditions can be readily obtained in a single tube with either forced circulation by pumping a single liquid-phase heat-transfer medium at high velocity, particularly high boiling liquids such as, but not limited to, molten salts or molten metals, et cetera, or by employing a two phase system such as, but not limited to, water, glycerine, or Dowtherm, et cetera, which boil in the desired temperature range. Commercially, however, a plurality of tubes in parallel are usually employed and the ideal single tube conditions are not readily obtainable due to the necessary close proximity of the tubes to each other, negating some of the conditions observed as ideal in the single tube system. It can be readily seen that equal distribution of liquid in a single phase system or equal distribution of vapor and liquid in a two phase system is difficult to attain in a plural tube system.

However, it should be pointed out that if the resistances to flow of either liquid or vapor surrounding each tube in a plural tube reactor are not identical, the slightly lower or higher pressure caused by more or less resistance will also cause a difference in the boiling temperature of the two phase heat-transfer medium surrounding the tube in question.

This automatically changes the temperature differential between the packed catalyst bed and the heat transfer medium and different conditions result. Higher resistances will cause a higher boiling temperature with the result that the oxidation will take place at an earlier stage within the tube, referring to distance rather than time, and the peak temperature will be higher. The converse is true of lower than normal temperature.

This invention comprises a means for precisely controlling the transfer of exothermic heat from a catalyst bed by surrounding the tubes with a boiling liquid heat exchange medium and controlling the liquid and boiling vapor distribution and movement within the reactor. Additionally, while it is not necessary in ordinarily encountered cases, in the special case where the temperature difference between the catalyst bed and the heat transfer medium exceeds the boiling range of the heat transfer medium used, additional circulation may be used to and from the reactor so that each tube more exactly receives its proportionate share of both liquid and vapor. This circulation can be obtained, when required, by using the natural energy imparted to the heat transfer medium by the exothermic heat of the catalyst bed, and circulation by pumping is not necessary.

The invention will be more clearly understood by reference to the accompanying drawings, wherein like numerals are used to designate like parts, and wherein:

FIGURE 1 is a horizontal sectional view of a multitube reactor, taken substantially in the plane of the line 1—1 in FIGURE 2;

FIGURE 2 is a vertical sectional view of the reactor, taken substantially in the plane of the line 2—2 in FIGURE 1; and FIGURE 3 is a diagram of temperature curves.

As shown in FIGS. 1 and 2, the reactor 10 comprises a circular or cylindrical outer shell 11, the center of the shell being indicated at 12 in FIG. 1. The shell is equipped with headers 13, 14, the header 13 having an inlet 15 for exothermic gases, while the header 14 has an outlet 16 for reaction products.

The shell 11 contains a plurality of tubes 17 containing a catalyst bed 17′, the tubes preferably although not necessarily being disposed in a circle having an outer periphery indicated at 18 and a center disposed at 19, as shown in FIG. 1. The reactor shell 11 is also provided with a liquid heat exchange medium inlet pipe 20 and with a vapor outlet pipe 21, the latter communicating with an overflow vessel 22. The system has a vapor outlet pipe 23 extending from the top of the overflow vessel 22 to suitable condensing means, such as are described in the aforementioned U.S. Patent No. 2,852,564, although others may be employed. The bottom of the overflow vessel 22 is provided with a liquid return pipe 24 connected to the liquid inlet pipe 20, and another liquid pipe 25 is connected to the liquid return pipe 24, returning colder liquid heat transfer medium from the condensing zone.

The internal flow of liquid and vapor in the reactor shell 11 is represented by the arrows 26, the vertical internal vapor space is indicated by the distance 27, and typical horizontal cross-sections of vertical regions of space between the shell 11 and the tube circle periphery 18, including the overlying vapor space are indicated at 28 and 29.

For illustrative purposes, one of the tubes 17 designated specifically as 17a is located near the liquid inlet pipe 20, and another tube specifically designated as 17b is located near the vapor outlet pipe 21. It will be apparent that if the distances 28 and 29 were the same by having the center 19 of the tube circle 18 at the same location as the center 12 of the shell 11, as for example in United States Patent No. 1,604,739, there would be a difference between the resistance to flow of vapor leaving the tube 17a and the resistance to flow of vapor leaving the tube 17b, since the vapor flow from the tube 17a has to travel further and is, at the same time, combined with the vapor flow from tubes between the tubes 17a and 17b. As the combined volumes of vapor become larger, the resistance increases, and thus it is much more difficult for the same quantity of vapor to leave the tube 17a as simultaneously leaves the tube 17b. Under the same conditions, as cooler liquid enters the liquid inlet pipe 20, the resistance to liquid flow is greater for the tube 17b than for the tube 17a. Such conditions will exist regardless of whether one or more liquid inlet or vapor outlet pipes are provided. Even if the space between the shell 11 and the tube circle 18 were left completely open, as by leaving a continuous opening in the shell or by extending the shell out so far as to make the resistance difference negligible, the vapor and liquid leaving the inner tubes near the centers 12, 19 would encounter a higher resistance than those at the periphery of the tube circle, and a slight difference in vapor and liquid flow in various portions of the reactor would still result. Additionally, if the shell 11 were made infinitely large, the liquid distribution would be further degraded by such a large outer space that the tubes at the periphery of the tube circle 18 would be cooler than those near the centers 12, 19, thus again upsetting the proportionate circulation of the heat transfer medium.

The invention overcomes the aforementioned distribution difficulties by displacing the center 19 of the tube circle 18 laterally from the center 12 of the shell 11, in a direction toward the liquid inlet pipe 20 and away from the vapor outlet pipe 21. This eccentric disposition of the tube circle 18 relative to the shell 11 produces a difference in the horizontal cross-section of the tube surrounding space as at 28 and 29. For example, the space cross-section at 29 is relatively small where the vapor flow is small and the desired liquid flow is also small. On the other hand, the space cross-section at 28 is relatively large to accommodate more vapor flow in that region. Simultaneously, liquid entering through the inlet pipe 20 is subjected to the smallest space cross-section, resulting in a high resistance which allows more liquid to preferentially flow toward the tube 17b. It has been found advantageous to arrange the space cross-section so as to provide a constant velocity, thus resulting in a more uniform resistance to both liquid and vapor flow throughout the reactor at any point.

Additionally, by a separate invention entitled "Exothermic Catalytic Reactions With Thermosyphon Flow," as disclosed in a patent application of Charles W. Horner, Ser. No. 646,110, filed June 14, 1967, it has been found that if the vapor space dimension 27 is maintained so that the liquid level of the heat exchange medium overflows through the pipe 21 into the vessel 22, the returning condensed vapor coming from the condensing zone is relatively cool and upon mixing with the relatively hot liquid in the vessel 22 it increases the density of the liquid entering the reactor through the inlet pipe 20, sufficiently to cause a high natural or thermosyphon circulation rate, so that it is not necessary to employ a circulation pump such as is used, for example, in U.S. Patent No. 2,852,564. As already stated, this thermosyphon flow arrangement is not a part of the present invention, but it is mentioned herein since it affords savings in operational energy where it is desired to have sufficient circulation of liquid within the reactor to prevent the bubble phenomenon mentioned in Patent No. 2,852,564.

The system hereinbefore described has been used successfully in commercial applications in the process of making organic aldehydes from alcohol, especially formaldehyde by vapor phase oxidation of methanol using Dowtherm as the two phase heat transfer medium, as set forth in the patents enumerated in the opening paragraph of this specification, but it is not necessarily limited thereto.

FIG. 3 shows temperature readings taken in the tubes 17a and 17b in a reactor designed to the disclosures of either U.S. Patent Nos. 1,604,739 or 2,582,564. It will be noted that the tube 17a shows a slightly higher activity by an earlier temperature rise and a higher temperature peak prior to cooling, than the tube 17b. In actual measurement, readings have been found which have a depth displacement indicated at 30 as high as 6 inches of the tube length and a temperature displacement as indicated at 31 having a temperature difference as high as 60° C.

Using the apparatus and method of this invention under similar conditions, the depth displacement 30 has been found to be a maximum of 1 inch of tube length or less, and the temperature displacement 31 to be a maximum of 30° C., providing that the annular velocities of both liquid and vapor are kept relatively constant in the space surrounding the reactor tubes.

In instances of methanol oxidation to formaldehyde where this invention has been used, but without either pumped circulation as described in Patent No. 2,852,564 or the thermosyphon flow as described in the aforementioned application of Charles W. Horner, the depth displacement 30 has been found to be a maximum of 2 inches of the tube length or less, and the temperature displacement 31 to be a maximum of 40° C., all other operating conditions being similar.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In an exothermic catalytic reactor, the combination of an outer shell having inlet and outlet headers for reactants and reaction products respectively, a group of tubes extending in said shell between said headers and each of said tubes containing a catalyst bed, said group of tubes being spaced inwardly from the shell to provide a surrounding space for a heat transfer medium, a liquid heat transfer medium inlet provided at one side of the shell, and a vaporized heat transfer medium outlet provided at the relatively opposite side of the shell, said group of tubes being disposed closer to said inlet than to said outlet whereby said surrounding space is narrower at the inlet than at the outlet for proportionately controlling the distribution and movement of both liquid and vapor constituents of the heat transfer medium in said shell.

2. The apparatus as defined in claim 1 wherein the center of said group of tubes is offset laterally from the center of said shell in a direction toward said inlet and away from said outlet.

3. The apparatus as defined in claim 2 wherein said shell is cylindrical and wherein the tubes in said group are disposed in a circle eccentric with respect to the cylindrical shell.

References Cited
UNITED STATES PATENTS

| | | | |
|---|---|---|---|
| 1,604,739 | 10/1926 | Downs | 23—288 |
| 1,812,341 | 6/1931 | Jaeger | 23—288 |
| 2,411,097 | 11/1946 | Kopp. | |
| 2,852,564 | 9/1958 | Warner et al. | 23—288 XR |
| 3,247,279 | 4/1966 | Lidov | 23—288 XR |

MORRIS O. WOLK, Primary Examiner

B. S. RICHMAN, Assistant Examiner

U.S. Cl. X.R.

165—175; 260—603, 700